United States Patent [19]

Liggett

[11] Patent Number: 4,496,707

[45] Date of Patent: Jan. 29, 1985

[54] POLYURETHANE AND METHOD FOR MAKING STABLE COMPONENTS THEREOF

[75] Inventor: Paul E. Liggett, Wooster, Ohio

[73] Assignee: Goodyear Aerospace Corporation, Akron, Ohio

[21] Appl. No.: 502,832

[22] Filed: Jun. 9, 1983

[51] Int. Cl.³ .............................................. C08L 75/06
[52] U.S. Cl. ..................................... 528/61; 525/939; 106/122; 528/64; 528/73; 524/906
[58] Field of Search ............... 523/400, 443, 461, 466; 106/41, 122; 528/61, 64, 73; 524/906; 525/939

[56] References Cited

U.S. PATENT DOCUMENTS

| 4,036,906 | 7/1977 | Finelli | 528/73 |
| 4,107,228 | 8/1978 | Horowitz et al. | 523/400 |
| 4,247,678 | 1/1981 | Chung | 528/83 |

Primary Examiner—Veronica P. Hoke
Attorney, Agent, or Firm—P. E. Milliken; D. J. Hudak; L. A. Germain

[57] ABSTRACT

A method for preparing a polyurethane wherein the components thereof have a long shelf life. The formulation is made by separately preparing a prepolymer solution, a crosslinking solution, and a cement solution. Upon utilization, the solutions are mixed together and applied. The urethane has very good fuel resistance and can be used as a coating in fuel tanks as well as to form integral fuel tanks.

18 Claims, No Drawings

4,496,707

POLYURETHANE AND METHOD FOR MAKING STABLE COMPONENTS THEREOF

TECHNICAL FIELD

The present invention relates to a process for preparing three separate components, which when combined and mixed form a polyurethane. The components, prior to mixing, have good stability. The polyurethane can be used as a coating and applied as by spraying.

BACKGROUND ART

Heretofore, various polyurethanes have been formulated.

A particular urethane polymer is set forth in U.S. Pat. No. 4,247,678 to Chung. While this urethane was an improvement over other urethanes, especially with regard to fuel and sealing resistance, its components generally had to be applied to an item within a relatively short time after combining thereof. That is, two separate components were generally made, one being the amine curative component and the remaining component containing all other ingredients. However, the remaining component had poor stability in that it would start to react with itself or crosslink with the isocyanate therein and generally had to be used within a week after preparation thereof.

The present invention comprises a polyurethane having an overall end paint formulation which is somewhat similar to the formulation set forth in Chung, U.S. Pat. No. 4,247,678. However, the present invention relates to various separate components which form the overall formulation and have unexpectant and very long shelf life of a matter of months, and even years.

DISCLOSURE OF INVENTION

It is therefore an aspect of the present invention to provide a process for preparing a polyurethane which has good stability.

It is a further aspect of the present invention to provide a process for preparing a polyurethane, as above, wherein a polymer solution, a crosslinking solution, and a cement solution are separately prepared and stored until application of the paint.

It is a further aspect of the present invention to provide a process for preparing a polyurethane, as above, wherein said urethane paint is a good sealant and has good resistance to hydrolysis.

It is yet another aspect of the present invention to provide a process for preparing a polyurethane, as above, wherein said urethane paint is very flexible, free from agglomerates, and is highly resistant to fuels.

These and other aspects of the present invention will become apparent by reference to the following application.

In general, a process for preparing a urethane formulation, comprising the steps of: separately preparing a polymer component, said polymer component comprising a urethane or a urethane prepolymer and a urethane solvent; separately preparing a curing component, said curing component comprising a urethane curing agent and a curing agent solvent; separately preparing a cement component, said cement component comprising an epoxy having solvent leaching resistance, and a solvent; a thixotropic compound, said thixotropic compound located in said curing component, or in said cement component, or in both; the total amount of solids in said overall formulation ranging from about 20 percent to about 60 percent by weight based upon the total amount of said solvents and said solids in said overall formulation.

In general, a polyurethane, said polyurethane made by separately preparing a polymer component, a curing component, and a cement component; said polymer component comprising a urethane or a urethane prepolymer and a urethane solvent, said curing component comprising a urethane curing agent and a curing agent solvent, said cement component comprising an epoxy having solvent leaching resistance, and a solvent; a thixotropic compound, said thixotropic compound located in said curing component, or in said cement component, or in both; said urethane produced by mixing said three components together and curing at a temperature of from about ambient to about 180° F.

BEST MODE FOR CARRYING OUT THE INVENTION

According to the present invention, a polyurethane is made by preparing three separate components. Prior to application or upon application, the components are mixed together and applied to a substrate or item. Each of the separate components has good stability and hence the paint has a good shelf life. The urethane, when applied, has very good sealant properties, is free from agglomerates, and is resistant to fuels.

One of the components is a urethane component in which a urethane is dissolved in a solvent. A curing agent component is generally comprised of a diamine curing agent dissolved in a solvent. The last component is a cement solution which generally contains an epoxy, an optional leveling agent, and a solvent. A thixotropic compound can be contained in either the cement component, the cure component, or in both, generally depending upon the pressure of the spraying apparatus. When combined, the components form a polyurethane formulation generally having an overall solids content of from about 20 percent to about 60 percent, preferably from about 40 percent to about 50 percent, and optimally about 42 to 43 percent by weight based upon the total weight of the polyurethane formulation containing all three components. The solid content is generally important in that too much solvent results in loss of an adhesive type film in that the polyurethane when used as a coating or paint would tend to run whereas too little solvent would result in a porous layer.

The polymer component comprises a polyester urethane such as that set forth in U.S. Pat. No. 4,247,678 which is hereby fully incorporated by reference with regard to the type and preparation of such a urethane. Essentially, the urethane polymer or prepolymer is made by reacting an aliphatic or alicyclic polyisocyanate, preferably an alkyl or a cycloalkyl polyisocyanate, with a polyester derived from the reaction of a glycol and a mixture of or co-condensation of an aliphatic dicarboxylic acid, preferably an alkyl dicarboxylic acid, and/or an aromatic dicarboxylic acid. The aliphatic or alkyl polyisocyanate can contain from 3 to 12 or more carbon atoms, with from 6 to 10 being preferred, and the alicyclic or cycloalkyl polyisocyanate can have from 5 to 25 or more carbon atoms, with from 8 to 15 being preferred. Generally, diisocyanates are preferred. An example of a preferred polyisocyanate is methylene bis(4-cyclohexylisocyanate), sold under the trademark Desmodur W, manufactured by Mobay Chemical Corporation.

Suitable polyols include those having a molecular weight of 500 or less, or desirably 200 or less. Preferably, the polyol is a glycol containing at least 2 carbon atoms as from 2 to about 10 carbon atoms, with from about 4 to about 6 being desired. Examples of specific glycols include 1,6-hexane diol, 1,4-butane diol, and ethylene glycol. The various hexane diols are preferred.

The aliphatic or alkyl dicarboxylic acids generally contain from about 2 to about 12 carbon atoms and preferably from about 6 to 9 carbon atoms. Specific examples include glutaric acid, adipic acid, and pimelic acid, with azelaic acid being preferred. Similarly, the aromatic dicarboxylic acids can contain from 8 to about 12 carbon atoms with 8 carbon atoms being preferred. Examples of such acids include terephthalic acid, phthalic acid, and naphthalene dicarboxylic acid, and the like, with isophthalic acid being preferred. The ratio of the aliphatic dicarboxylic acids to the aromatic acids in either the co-polymerization condensation reaction or as a physical mixture varies from 10 to 90 percent by weight. The polyester is formed by the reaction of the acids and the glycol according to any conventional process and generally has a molecular weight of from about 500 to about 4,000, with from about 1,000 to about 3,000 being preferred.

The ratio of the equivalent amount of isocyanate used to the equivalent amount of hydroxy end groups in the polyester ranges from about 1.5 to about 3.0 and preferably from about 1.8 to about 2.2.

Any conventional solvent can be utilized to dissolve the urethane polymer or prepolymer. Specific examples include aromatic compounds having from 6 to 10 carbon atoms and aliphatic, preferably alkyl substituted compounds having from 3 to 8 carbon atoms. Examples of aromatic solvents include xylene, toluene, benzene, and the like, whereas examples of aliphatic compounds include methyl ethyl ketone, methyl isobutyl ketone, and the like. An amount of solvent is utilized such that the amount of urethane solids in the polymer component ranges from about 50 to about 75 percent, desirably from about 60 to about 65 percent, and optimally from about 63 to about 65 percent by weight.

The cure component comprises an amine curing agent in a solvent. Generally, any conventional amine curing agent, e.g., normal or fast, can be utilized such as alkyl diamines containing from 2 to 10 carbon atoms, cycloalkyl diamines containing from 4 to 20 carbon atoms, an aromatic or alkyl substituted aromatic diamines having from 6 to 20 carbon atoms. Examples of specific normal diamine curing agents include propylenediamine, 1,4-cyclohexane-bis(methylamine), and phenylenediamine. A preferred diamine compound is methylenedianiline (MDA). Often it is desirable to use a so-called "fast" type curing amine compound so that a plurality of layers can be applied upon one another in a relatively short period of time. Such amines are well known to the art. Specific examples include $H_{12}$ MDA, that is (bis-4-aminocyclohexyl)methane; MXDA, that is metaxylene diamine; 1,3-BAC, that is 1,3-bis(aminomethyl)cyclohexane, ethylene diamine, hexamethylene diamine, and the like. Although polyols having 2 or 3 hydroxyls or less than 400 molecular weight can be utilized, they are generally too slow reacting and, hence, are not favored. Examples of such polyols are the same as set forth above with regard to the urethane, such as the various glycols, e.g., 1,4-butane diol, etc.

The curing agent is dissolved in any conventional solvent such as the same solvents utilized with the urethane polymer, for example, an aromatic or an aliphatic. Examples of specific solvents include methyl ethyl ketone, methyl isobutyl ketone, toluene, and the like. The amount of solvent is such that the amount of solid diamine contained therein generally ranges from about 5 to about 30 percent by weight, desirably from about 10 to about 15 percent, and optimally about 13 to about 15 percent by weight. Of course, it should be understood that the amount of solvent in the cure component, as in the polymer component, can be varied over a wide range so long as the total solvent or percent solids in the final paint, when all three components are combined, is as set forth above. The amount of diamine or polyol when combined with the polymer component is such that the equivalent ratio of diamine or polyol to diisocyanate ranges from about 0.8 to about 1.2, desirably from 0.9 to about 0.95, and optimally about 0.93. Excessive amounts of diisocyanate will result in reduced hydrolysis resistance whereas too small amounts will result in unsuitable solvent or jet fuel resistance and a reduced cure rate.

Inasmuch as the overall polyurethane formulation is generally based upon 100 parts by weight of the urethane polymer, the amount of the urethane solvent can be readily calculated therefrom. Similarly, the amount of diamine can readily be calculated by the equivalent ratio of diisocyanate to diamine. Hence, the amount of diamine solvent can also readily be determined.

The third component, that is the cement component generally comprises a leveling agent, an epoxy compound, and a solvent. Moreover, either the cement component, the cure component, or both can contain a thixotropic agent. Should the polyurethane formulation be sprayed at a relatively low pressure, for example at 125 psi or less, at 100 psi or less, or even at 50 psi or less, the thixotropic agent is desirably blended in the cure component when a pigment is utilized. Otherwise at low pressures when a pigment is used in a cement comonent, agglomerations, globules, etc., usually form due to contact of the thixotropic agent and that pigment. Such agglomerations can often jam up the spray gun and/or result in a rough coating surface. Such a problem can be eliminated if the formulation is strained as through an 80 to 100 mesh screen. However, this process is not practical in large batch operations since the straining must be performed on cement that contains the diamine accelerator. Such could result in permanent clogging of the strainer with reacted urethane. The thixotropic agent is important in that it is utilized to generally keep the polyurethane from running. The amount of thixotropic agent generally ranges from about 2 parts to about 8 parts by weight based upon 100 parts by weight of urethane in the overall polyurethane formulation, and desirably from about 3 to about 6 parts. Generally, any conventional thixotropic compound can be used. Suitable thixotropic agents include silicon dioxide, Cab-o-Sil (Cabot Corp.) surface modified aluminum silicate, manufactured by Georgia Kaolin Company and sold under the brand name "Kaophile #2," and the like. These compounds generally exist as very fine particles so that they can be incorporated in the overall polyurethane formulation and sprayed as from a spray gun.

Although a leveling agent is generally utilized such that the paint surface is smooth, it need not always be included in the paint formulation. Generally, any conventional leveling agent can be utilized such as cellulose acetate butyrate and "Modaflow," manufactured by Monsanto Industrial Chemicals Company. The amount of the leveling agent generally varies from about 0.5 parts by weight to about 3 parts by weight, based upon 100 total parts by weight of urethane in the formulation. A more desired range is from about 0.5 parts to about 1.25 parts by weight. Inasmuch as the leveling agent tends to reduce surface tension and hence tends to counteract a thixotropic agent, high amounts thereof are not utilized.

With regard to the epoxy compound, a nonleachable type is preferred such that it does not leach out in the presence of solvents or fuels residing upon the final paint formulation. An example of one such specific epoxy resin is Epon 1001, manufactured by the Shell Chemical Company. Generally, this epoxy is 4,4'-isopropylidenediphenol-epichlorohydrin. Another suitable epoxy is D.E.R. 732, manufactured by the Dow Chemical Company. This epoxy is an epichlorohydrin-polyglycol reaction product. The amount of epoxy generally ranges from about 3 to about 7 parts by weight with from about 5 to about 6 being preferred, based upon 100 parts by weight of urethane polymer in the overall final polyurethane formulation.

Generally, any colorant such as a pigment or dye can be utilized in the cement component to impart a desired color. The amount can range from very small, e.g., from about 0.5 parts to large amounts, i.e., from about 10 to 15 parts by weight. Examples of various pigments include carbon black, titanium dioxide, chromic oxide, and the like. Of course, many other pigments in various amounts can be utilized to achieve a desired color or hue.

The amount of solvent in the cement component can vary over a wide range and exists in such amounts such that when the three components are blended together, the total amount of solids in the overall paint formulation ranges from about 20 percent to about 60 percent by weight. Typically, the amount of solvent existing in the cement component ranges from about 25 parts by weight to about 250 parts by weight, with from about 50 to about 200 parts being desired, based upon 100 total parts by weight of urethane polymer or prepolymer in the formulation. The solvents can be any of the types utilized in the polymer component or the cure component. Thus, toluene, xylene, methyl ethyl ketone, methyl isobutyl ketone, and the like, or combinations thereof, can be utilized.

Each fraction or component of the polyurethane formulation of the present invention unexpectantly has very good stability and thus good shelf life. Thus, the various separate components can be made and kept separate for a number of months and then brought together and mixed in any conventional manner and applied to a substrate. For example, the components can be fed through three separate lines to a spray gun where they are then mixed together and sprayed upon a desired substance or substrate. Generally, any conventional type of mixing device can be utilized as well as any conventional type of spraying apparatus such as any airless type spray gun. The application of the polyurethane formulation to the substrate can be through a spray gun, through brushing, coating, or the like. Upon application, the various solvents evaporate and the diamine curing agent reacts with the urethane to yield a cured polyurethane formulation. Although cure can be at ambient temperature, that is for example 65° F., generally heat is applied to speed the curing operation. Cure can thus occur from about ambient temperature to about 180° F. and preferably from about 140° to about 160° F. Heating at higher temperatures tends to create a porous paint and, hence, is undesirable. Generally, any desired thickness can be applied at one application and any number of applications can be applied to yield a desired thickness. Usually, the final thickness can range from about 10 to about 50 mils.

With regard to the actual mixing, the three components are generally mixed simultaneously or within a short time period of one another, as for example a few minutes. Alternatively, the cement component can be mixed with the polymer component, but such cement-polymer mixture should be combined with the cure component generally within a few days since stability of the cement-polymer component is not very good.

The polyurethane formulation, when prepared according to the present process, has good flexibility, good resistance to hydrolysis, and has excellent resistance to fuels, and the like. Moreover, the polyurethane forms a very good sealant coat. Accordingly, it can be utilized to contain fuel as for automobiles, aircraft, and the like. Thus, it can be sprayed as to the inside of a container, a fuel tank, a flexible rubber fuel tank, and the like. It can also be applied to an aircraft fuselage or wing to seal said area. Moreover, in the wing area, a sufficient coating can be made to form an integral fuel tank within the aircraft wing. This is, the polyurethane of the present invention can be sprayed over various integral parts and thereby seal them from the fuel. Such an application can result in approximately a 20 percent increase in the fuel tank area.

The present invention will be better understood by reference to the following examples.

EXAMPLES

Various formulations were prepared as set forth in Table I.

TABLE I

| Formulation | A | B | C | D |
|---|---|---|---|---|
| Prepolymer (% NCO = 3.35)* | 100.00 | 100.00 | 100.00 | 100.00 |
| Toluene | 56.27 | 56.27 | 56.27 | 56.27 |
| "Modaflow" | 1.00 | 1.00 | 1.00 | 1.00 |
| "EPON 1001-B-80" | 6.25 | 6.25 | 6.25 | 6.25 |
| "Cab-o-Sil M-5" | 4.58 | 2.25 | 4.58 | 4.58 |
| Carbon Black | 1.27 | 1.27 | — | 1.27 |
| Methylethylketone (MEK) | 59.07 | 14.35 | 70.80 | 59.07 |
| 60% titanium dioxide in/ "EPON 828" | — | — | 10.48 | — |
| Methylenedianaline (MDA) | 7.34 | 7.34 | 7.34 | — |
| Metaphenylenediamine (MPD) | — | — | — | 4.00 |
| MEK | 43.50 | 7.34 | 44.79 | 45.59 |
| Total | 279.28 | 196.07 | 301.51 | 278.03 |
| Percent Solids | 42.68 | 59.60 | 42.59 | 41.67 |
| diamine/diisocyanate ratio | .93 | .93 | .93 | .93 |

*polyhexamethylene isophthalate/azelate having a molecular weight of 2,000 made with methylene bis(4-cyclohexylisocyanate).

Each polyurethane formulation was made as follows: The urethane component was prepared by mixing the prepolymer with the solvent in a container having an inert atmosphere therein such as nitrogen. Upon mixture thereof, the container was sealed with the inert gas therein to protect it from moisture. The cement component was made by adding the various ingredients to a container and mixing. Desirably, the cement component was sealed in an airtight container. Similarly, the ingredients of the curing component were added and mixed in a suitable container and then sealed.

After storage for at least three weeks, the polymer component, the cement component, and the cure component of Formulation A were fed to a spray gun and sprayed within an aircraft wing assembly for the purpose of forming a fuel tank or cell therein. No spraying problems were encountered nor was there any problem with forming a suitable fuel tank. In such a manner, all three of the components of Formulation C were added to a spray gun and also sprayed into a wing assembly. After two months time, the applied polyurethane layer still had very good physical properties and had not evidenced any hydrolysis attack, or the like. The fuel resistance of such sprayed article remains excellent.

Furthermore, the urethane component of Formulas A, B, C or D have been prepared and stored in excess of four months. When tested, the percent of isocyanate level is still very high and almost identical to the original level. In contrast, the urethane component of the prior formulation, that is as set forth in U.S. Pat. No. 4,247,678, when plotted on a chart showing the percent of isocyanate loss per day, exhibited a slope of −0.011. Such a composition after ten day storage was unsuitable for forming a polyurethane when sprayed. That is, the sprayed layer did not have good physical properties, and did not form a good fuel resistance layer.

The formulations of Table I should only be used in air spray equipment if they are strained through an 80 to about 100 mesh screen. Preferably, they are utilized with high pressure equipment as on the order of 1,000 or 1,500 psi. Otherwise, agglomerations would usually form when utilized with low pressure spray equipment.

The formulation of Table II contains the thixotropic agent in the curing component and thus can be sprayed utilizing low pressure spray equipment. Such a formulation produced a urethane layer essentially free of any agglomerations.

TABLE II

| FORMULATION | E | F |
|---|---|---|
| Prepolymer (% NCO = 3.35) | 100.00 | 100.00 |
| Toluene | 56.27 | 56.27 |
| "Modaflow" | 1.00 | 1.00 |
| "EPON 1001-B-80" | 6.25 | 6.25 |
| Carbon Black | 1.27 | — |
| Methylethylketone (MEK) | 37.35 | 50.37 |
| 60% titanium dioxide in "EPON 828" | — | 10.48 |
| Methylene dianiline (MDA) | 7.34 | 7.34 |
| MEK | 65.22 | 65.22 |
| "Cab-o-Sil M-5" | 4.58 | 4.58 |
| TOTAL | 279.28 | 301.51 |
| Percent Solids | 42.68 | 42.59 |
| Diamine/diisocyanate ratio | .93 | .93 |

According to the present invention, the components set forth in the cement will virtually have no degradation or harmful affect upon storage. To date, such a component, as set forth in Formula C has been stored nine months without any notable deleterious affect. Naturally, the curing agent component, so long as sealed, will also not degrade over a long period of time.

Accordingly, the process of the present invention permits the various components to be separately manufactured and then stored and/or shipped for long periods of time before mixing of the ingredients and applied to an object. The polyurethane paint of the present invention can generally be utilized in situations wherein a good polyurethane sealant or barrier layer is desired which has good resistance to hydrolysis or to fuels.

While in accordance with the patent statutes, a best mode and preferred embodiment has been described, the invention is limited by the scope of the attached claims.

What is claimed is:

1. A process for preparing a urethane formulation, comprising the steps of:

separately preparing a polymer component, said polymer component comprising a urethane prepolymer and a urethane solvent;

the amount of said urethane prepolymer in said urethane component is about 100 parts by weight, wherein said urethane prepolymer is the reaction product of (1) an aliphatic polyisocyanate having from 3 to 12 carbon atoms, or an alicyclic polyisocyanate having from 5 to 25 carbon atoms and (2) a mixed polyester, said mixed polyester being (a) a copolymerization condensation product of, or (b) a separate physical blend of, an aliphatic dicarboxylic acid having from 2 to 12 carbon atoms and an aromatic dicarboxylic acid having from 8 to 12 carbon atoms with (2) a polyol having a molecular weight of 500 or less, the amount of said aliphatic dicarboxylic acid ranging from about 90 percent to about 10 percent by weight, the molecular weight of said polyester made from said acid and said polyol ranging from about 500 to about 4,000, and wherein the equivalent ratio of said isocyanate to the OH end groups in said polyester ranges from about 1.5 to about 3.0;

separately preparing a curing component, said curing component comprising a urethane curing agent and a curing agent solvent the equivalent ratio of said curing agent to said isocyante being from about 0.8 to about 1.2;

separately preparing a cement component, said cement component comprising about 3 to about 7 parts by weight, per 100 parts by weight of said urethane prepolymer, of an epoxy having solvent leaching resistance, and a solvent;

a thixotropic compound, said thixotropic compound located in said curing component, the amount of said thixotropic agent being from about 2 parts by weight to about 8 parts by weight per 100 parts by weight of said urethane prepolymer;

maintaining said cement component separate from said polymer component and said curing agent, and maintaining said polymer component separate from said curing component thereby maintaining stability of each of said components;

the total amount of solids in said overall formulation ranging from about 20 percent to about 60 percent by weight based upon the total amount of said solvents and said solvents in said overall formulation.

2. A process according to claim 1, wherein said curing agent is selected from the group consisting of an alkyl diamine having from 2 to 10 carbon atoms, a cycloalkyl diamine having from 4 to 20 carbon atoms, an aromatic or an alkyl substituted aromatic diamine having from 6 to 20 carbon atoms, a polyol having a molecular weight of 500 or less, and wherein the equivalent ratio of said diamine or said polyol to said polyisocyanate ranges from about 0.8 to about 1.2.

3. A process according to claim 3, wherein the amount of said thixotropic agent ranges from about 2 to about 8 parts by weight, wherein the amount of said epoxy ranges from about 3 to about 7 parts by weight, and an amount of solvent such that the overall formulation has said 20 to 60 percent of solids therein; and wherein said stability of each component has a shelf life of at least ten days.

4. A process according to claim 3, wherein at least 90 percent of said polyisocyanate is an alkyl diisocyanate having from 6 to 10 carbon atoms or a cycloalkyl diisocyanate having from 8 to 15 carbon atoms wherein said polyol forming said polyester is a glycol having from 2 to 10 carbon atoms, wherein said aliphatic dicarboxylic acid has from 6 to 9 carbon atoms, and wherein the equivalent ratio of said isocyanate to the hydroxyl end groups in said polyester ranges from about 1.8 to about 2.2.

5. A process according to claim 4, wherein said polyester has a molecular weight of from about 1,000 to about 3,000, wherein said polyol forming said polyester has a molecular weight of 200 or less, wherein the amount of thixotropic agent ranges from about 3 parts to about 6 parts by weight, wherein the amount of solids in said urethane component ranges from about 50 to about 75 percent, wherein the amount of solids in said curing agent component ranges from about 5 to about 30 percent by weight, and wherein the amount of solvent in said cement component ranges from about 25 parts to about 250 parts by weight, based upon 100 parts by weight of said urethane polymer or prepolymer, wherein said curing agent in said curing agent component is a diamine, and wherein the equivalent ratio of said diamine to said isocyanate ranges from about 0.9 to about 0.95.

6. A process according to claim 5, wherein said thixotropic agent is silicon dioxide, wherein said epoxy is 4,4'-isopropylidenediphenol-epichlorohydrin, and wherein said polyol is hexane diol and wherein said shelf life of each component is at least three weeks.

7. A process according to claim 6, wherein said polyisocyanate is methylene bis(4-cyclohexylisocyanate), and wherein said aliphatic dicarboxylic acid is azelaic acid, and wherein said aromatic dicarboxylic acid is isophthalic acid, and wherein said diamine is selected from the group consisting of methylenedianiline, (bis-4-aminocyclohexyl) methane, 1,3-bis(aminomethyl)cyclohexane, ethylene diamine, and hexamethylene diamine.

8. A process according to claim 6, including mixing together said polymeric component, said cement component, and said curing component to form a polyurethane formulation, wherein said thixotropic agent is located in said cure component, including applying said polyurethane formulation to a substrate, and curing said formulation by heating from ambient to about 180° F.

9. A process according to claim 7, including mixing together said polymeric component, said cement component, and said curing component to form a polyurethane formulation, including applying said polyurethane formulation to a substrate, and curing said formulation by heating from ambient to about 180° F.

10. A process according to claim 8, wherein said substrate is an airplane.

11. A process according to claim 9, wherein said substrate is an aircraft wing component.

12. A polyurethane, said polyurethane made by separately preparing a polymer component, a curing component, and a cement component;

said polymer component comprising a urethane prepolymer and a urethane solvent, said curing component comprising a urethane curing agent and a curing agent solvent, said cement component comprising from about 3 to about 7 parts by weight, per 100 parts by weight of said urethane prepolymer, of an epoxy having solvent leaching resistance, and a solvent; the amount of said urethane prepolymer in said urethane component is about 100 parts by weight, wherein said urethane prepolymer is the reaction product of (1) an aliphatic polyisocyanate having from 3 to 12 carbon atoms, or an alicyclic polyisocyanate having from 5 to 25 carbon atoms, (2) a mixed polyester, said mixed polyester being (a) a copolymerization condensation product of, or (b) a separate physical blend of, an aliphatic dicarboxylic acid having from 2 to 12 carbon atoms and an aromatic dicarboxylic acid having from 8 to 12 carbon atoms with (2) a polyol having a molecular weight of 500 or less, the amount of said aliphatic dicarboxylic acid ranging from about 90 percent to about 10 percent by weight, the molecular weight of said polyester made from said acid and said polyol ranging from about 500 to about 4,000, and wherein the equivalent ratio of said isocyanate to the OH end groups in said polyester ranges from about 1.5 to about 3.0;

the equivalent ratio of said curing agent to said isocyanate being from about 0.8 to about 1.2;

a thixotropic compound, said thixotropic compound located in said curing component, the amount of said thixotropic agent being from about 2 parts by weight to about 8 per 100 parts by weight of said urethane prepolymer;

said urethane produced by maintaining said polymer component, said curing component, and said cement component separate from each other until prior to application, maintaining each said component separate from each other and thereby maintaining the stability of each of said components, and subsequently mixing said three components together and curing at a temperature of from about ambient to about 180° F.

13. A polyurethane according to claim 12, wherein said curing agent is selected from the group consisting of an alkyl diamine having from 2 to 10 carbon atoms, a cycloalkyl diamine having from 4 to 20 carbon atoms, an aromatic or an alkyl substituted aromatic diamine having from 6 to 20 carbon atoms, a polyol having a molecular weight of 500 or less, and wherein the equivalent ratio of said diamine or said polyol to said polyisocyanate ranges from about 0.8 to about 1.2, and wherein said stability of each component has a shelf life of at least three weeks.

14. A polyurethane according to claim 13, wherein the amount of said thixotropic agent ranges from about 2 to about 8 parts by weight, wherein the amount of said epoxy ranges from about 3 to about 7 parts by weight, and an amount of solvent such that the overall formulation has said 20 to 60 percent of solids therein, and wherein at least 90 percent of said polyisocyanate is an alkyl diisocyanate having from 6 to 10 carbon atoms or a cycloalkyl diisocyanate having from 8 to 15 carbon atoms, wherein said polyol forming said polyester is a glycol having from 2 to 10 carbon atoms, wherein said aliphatic dicarboxylic acid has from 6 to 9 carbon atoms, and wherein the equivalent ratio of said isocyanate to the hydroxyl end groups in said polyester ranges from about 1.8 to about 2.2.

15. A polyurethane according to claim 14, wherein said polyester has a molecular weight of from about 1,000 to about 3,000, wherein said polyol forming said polyester has a molecular weight of 200 or less, wherein the amount of thixotropic agent ranges from about 3 parts to about 6 parts by weight, wherein the amount of solids in said urethane component ranges from about 50 to about 75 percent, wherein the amount of solids in said curing agent component ranges from about 5 to about 30 percent by weight, and wherein the amount of solids in said cement component ranges from about 25 parts to about 250 parts by weight, based upon 100 parts by weight of said urethane polymer or prepolymer, wherein said curing agent in said curing agent component is a diamine, and wherein the equivalent ratio of said diamine to said isocyanate ranges from about 0.9 to about 0.95.

16. A polyurethane according to claim 15, wherein said thixotropic agent is silicon dioxide, wherein said epoxy is 4,4'-isopropylidenediphenol-epichlorohydrin, and wherein said polyisocyanate is methylene bis(4-cyclohexylisocyanate), wherein said aliphatic dicarboxylic acid is azelaic acid, wherein said aromatic dicarboxylic acid is isophthalic acid, and wherein said diamine is selected from the group consisting of methylenedianiline, (bis-4-aminocyclohexyl)methane, or 1,3-bis-(aminomethyl)cyclohexane, ethylene diamine, and hexamethylene diamine, and wherein said polyol is hexane diol.

17. A polyurethane according to claim 14, wherein said urethane is applied to an airplane and forms a sealant layer.

18. A polyurethane according to claim 16, wherein said urethane forms a fuel tank.

* * * * *